(12) United States Patent
Huang et al.

(10) Patent No.: US 12,176,562 B2
(45) Date of Patent: Dec. 24, 2024

(54) BATTERY PACK AND VEHICLE

(71) Applicant: CONTEMPORARY AMPEREX TECHNOLOGY (HONG KONG) LIMITED, Hong Kong (CN)

(72) Inventors: Haihua Huang, Ningde (CN); Xingyuan Wu, Ningde (CN); Weigang Shi, Ningde (CN)

(73) Assignee: CONTEMPORARY AMPEREX TECHNOLOGY (HOLN KONG) LIMITED, Hong Kong (CN)

( * ) Notice: Subject to any disclaimer, the term of this patent is extended or adjusted under 35 U.S.C. 154(b) by 570 days.

(21) Appl. No.: 17/357,819

(22) Filed: Jun. 24, 2021

(65) Prior Publication Data
US 2021/0320368 A1 Oct. 14, 2021

Related U.S. Application Data

(63) Continuation of application No. PCT/CN2019/125178, filed on Dec. 13, 2019.

(30) Foreign Application Priority Data

Dec. 29, 2018 (CN) .......................... 201822256032.4

(51) Int. Cl.
*H01M 50/242* (2021.01)
*H01M 50/209* (2021.01)
(Continued)

(52) U.S. Cl.
CPC ....... *H01M 50/242* (2021.01); *H01M 50/249* (2021.01); *H01M 50/271* (2021.01); *H01M 50/209* (2021.01); *H01M 2220/20* (2013.01)

(58) Field of Classification Search
CPC ............ H01M 50/242; H01M 50/249; H01M 50/209; H01M 2220/20
See application file for complete search history.

(56) References Cited

U.S. PATENT DOCUMENTS

| | | | |
|---|---|---|---|
| 2009/0166116 A1* | 7/2009 | Kiya ................... | H01M 50/209 180/68.5 |
| 2018/0019455 A1* | 1/2018 | Chen ................... | H01M 50/291 |

(Continued)

FOREIGN PATENT DOCUMENTS

| | | |
|---|---|---|
| CN | 107507938 A | 12/2017 |
| CN | 207558892 U | 6/2018 |

(Continued)

OTHER PUBLICATIONS

Contemporary Amperex Technology Co., Limited, Extended European Search Report, EP19903862.1, Mar. 7, 2022, 9 pgs.

(Continued)

*Primary Examiner* — Adam A Arciero
(74) *Attorney, Agent, or Firm* — Kilpatrick Townsend & Stockton LLP (57) ABSTRACT

The application provides a battery pack and a vehicle. The battery pack includes a battery box, reinforcing members being arranged on a bottom surface of the battery box; and at least one battery unit, located in the battery box. The battery unit includes: end plates; side plates, the side plates and the end plates being connected end to end in sequence to define an accommodating cavity, and the side plates being stacked on the reinforcing members in a height direction of the battery box; and a plurality of battery cores, located in the accommodating cavity.

11 Claims, 7 Drawing Sheets

(51) Int. Cl.
*H01M 50/249* (2021.01)
*H01M 50/271* (2021.01)

(56) References Cited

U.S. PATENT DOCUMENTS

2018/0337374 A1    11/2018  Matecki et al.
2019/0348651 A1*   11/2019  Templeman ........ H01M 50/202

FOREIGN PATENT DOCUMENTS

| CN | 208189681 U | 12/2018 |
| CN | 209087957 U | 7/2019 |
| JP | 2012169171 A | 9/2012 |

OTHER PUBLICATIONS

Contemporary Amperex Technology Co., Limited., International Search Report and Written Opinion, PCT/CN2019/125178, Mar. 12, 2020, 14 pgs.

* cited by examiner

BATTERY PACK AND VEHICLE

CROSS-REFERENCE TO RELATED APPLICATIONS

The application is a continuation application of PCT Patent Application No. PCT/CN2019/125178, entitled "BATTERY PACK AND VEHICLE" filed on Dec. 13, 2019, which claims priority to Chinese Patent Application No. 201822256032.4, filed with the China National Intellectual Property Administration on Dec. 29, 2018 and entitled "BATTERY PACK", all of which are incorporated herein by reference in their entireties.

TECHNICAL FIELD

The application relates to the technical field of batteries, and in particular, to a battery pack and a vehicle.

BACKGROUND

In recent years, the emergence of new energy vehicles has largely promoted social development and environmental protection. A power battery pack is a rechargeable battery, which is a power source of the new energy vehicles, and has been widely applied in the field of new energy vehicles. At present, an assembling process of an overall battery pack is mainly divided into three steps: firstly, assembling battery units into a battery module; secondly, locking the battery module in a box body of the battery pack; and finally, mounting an overall battery pack which is configured in a box to a finished vehicle. To guarantee the overall structural strength of the battery pack and realize safe driving of a vehicle, at present, firm mounting to the finished vehicle is realized mainly by arranging a plurality of mounting brackets and high strength beams around the box body.

The battery pack in the prior art can be firmly connected to the finished vehicle in the foregoing manner. However, in the existing manner, the firm mounting is realized mainly by adding a plurality of redundant structures, such as reinforcing beams, which increases the manufacturing cost, and also increases the weight of the battery pack and the finished vehicle, thereby increasing the energy consumption of the vehicle.

SUMMARY

An objective of the application is to provide a battery pack and a vehicle, so as to alleviate the prior-art technical problem that a whole body is heavy because a mounting bracket needs to be connected externally to guarantee structural strength due to an unreasonable design of the battery pack.

The application provides a battery pack, including:
a battery box, reinforcing members being arranged on a bottom surface of the battery box; and
at least one battery unit, the battery unit being located in the battery box, and the battery unit including:
end plates;
side plates, the side plates and the end plates being connected end to end in sequence to define an accommodating cavity, and the side plates being stacked on the reinforcing members in a height direction (Y) of the battery box; and
a plurality of battery cores, located in the accommodating cavity.

Further, a plurality of the battery units are provided, where
the reinforcing member and two adjacent side plates are stacked together in the height direction (Y) of the battery box.

Further, the side plate includes:
a side plate body, the end plates and the side plate bodies being connected end to end in sequence to define the accommodating cavity;
a bottom supporting plate, the battery cores and the end plates being all arranged on the bottom supporting plate; and
a first connecting plate, the first connecting plate and the bottom supporting plate being oppositely arranged on two sides of the side plate body, where
two adjacent first connecting plates are stacked together.

Further, in a direction (X) perpendicular to the first connecting plate, two adjacent first connecting plates are stacked together in the height direction (Y) of the battery box.

Further, the battery pack further includes:
a pressing piece, located in the battery box, and the pressing piece, the first connecting plate, and the reinforcing member being stacked in sequence in the height direction of the battery box, where
the battery cores and the end plates are all clamped between the pressing piece and the bottom supporting plate.

Further, the pressing piece includes:
a second connecting plate, the second connecting plate, the first connecting plate, and the reinforcing member being stacked in sequence in the height direction of the battery box through connecting pieces; and
a pressing plate, connected to the second connecting plate, the battery cores and the end plates being all located between the pressing plate and the bottom supporting plate.

Further, the pressing plate is higher than the second connecting plate, and a recessed portion is formed between the pressing plate and the second connecting plate.

Further, the battery box includes:
a box body; and
a plurality of reinforcing beams, connected to a bottom surface of the box body at equal spacings, the first connecting plate, the second connecting plate, and the reinforcing beams being all parallel to the stacking direction of the battery cores, and the reinforcing beams being the reinforcing members.

Further, the battery pack further includes:
a first reinforcing bracket, connected between two adjacent reinforcing beams; and
a second reinforcing bracket, arranged on an outer wall of the box body, the first reinforcing bracket being connected to the second reinforcing bracket through connecting pieces.

Further, a hoisting member is arranged on an end surface of the end plate facing away from the bottom surface of the box body. The battery pack is hoisted on a top plate of a mounting box of a vehicle through the hoisting members.

Further, the first connecting plates, the second connecting plates, the reinforcing beams, the first reinforcing brackets, and the second reinforcing brackets are all made of aluminum profiles with cavities.

The application has the following beneficial effects:
The application provides a battery pack. The battery pack includes a battery box, and at least one battery unit located in the battery box. Reinforcing members are arranged on a bottom surface of the battery box. Specifically, the battery unit includes end plates and side plates, where further, the side plates and the end plates are connected end to end in sequence to define an accommodating cavity, and the side plates are stacked on the reinforcing members in a height direction of the battery box; and a plurality of battery cores that are stacked together, where the plurality of battery cores are located in the accommodating cavity. During assembly of the battery pack, the end plates and the side plates of the battery units are alternately connected in sequence, the battery cores that are stacked together are placed in the accommodating cavity formed by the end plates and the side plates, and finally, the side plates are stacked on the reinforcing members on the bottom surface of the battery box in the height direction of the battery box. Through the stacking fit of the side plates and the reinforcing members on the bottom surface of the battery box, the structural strength of the reinforcing members is improved, thereby improving the structural strength of the overall battery box, and ensuring the firmness and stability of a connection between the battery pack and a finished vehicle. This structure design uses the stacking fit of the side plates of the battery units and the reinforcing members arranged in the battery box to increase a thickness of the reinforcing members in the battery box, thereby improving the structural strength of the reinforcing members, and improving the overall strength of the battery box without increasing an original weight of the battery pack. The design is smart, and the structure is reasonable, which reduces energy consumption of a vehicle.

The application provides a vehicle. The vehicle includes a mounting box and the foregoing battery pack.

The battery pack is mounted on the mounting box through the hoisting members, where a top surface of the mounting box is a box cover of the box body of the battery box.

The application has the following beneficial effects:

The battery pack is hoisted on a top plate of the mounting box of the vehicle through the hoisting members, which avoids lowering of the structure of the box body caused by forming a mounting hole in the bottom surface of the box body of the battery box for connecting the battery pack to the mounting box of the vehicle. In addition, the battery pack is hoisted in the mounting box of the vehicle, and the top surface of the mounting box of the vehicle is used as the box cover of the box body of the battery pack, which simplifies a structural design and reduces the cost.

BRIEF DESCRIPTION OF DRAWINGS

To describe the technical solutions in the specific implementation manners of the application or in the prior art more clearly, the following briefly describes the accompanying drawings required for describing the specific implementation manners or the prior art. Apparently, the accompanying drawings in the following description show merely some implementation manners of the application, and a person of ordinary skill in the art may still derive other drawings from these accompanying drawings without creative efforts.

REFERENCE SIGNS 1. battery box;
   11. box body;
   12. reinforcing beam;
2. battery unit;
   21. end plate;
      211. hoisting member;
   22. side plate;
      221. side plate body;
      222. bottom supporting plate;
      223. first connecting plate;
   23. battery core;
3. pressing piece;
   31. second connecting plate;
   32. pressing plate;
   33. recessed portion;
4. first reinforcing bracket; and
5. second reinforcing bracket.

DESCRIPTION OF EMBODIMENTS

The following clearly and completely describes the technical solutions of the application with reference to the accompanying drawings. Apparently, the described embodiments are part but not all of the embodiments of the application. Based on the embodiments of the application, all other embodiments obtained by a person of ordinary skill in the art fall within the protection scope of the application.

In the descriptions of the application, it should be noted that orientations or positional relationships indicated by the terms "inside", "outside" and the like is an orientation or positional relationship shown in the accompanying drawings, and are merely for the convenience of describing the application and simplifying the description, rather than indicating or implying that the devices or elements must have a particular orientation, and constructed and operated in the particular orientation. Therefore, it cannot be construed as a limitation to the application.

In the descriptions of the application, it should be noted that, unless otherwise specified and defined explicitly, the terms "mounted", "interconnected" and "connected" are to be interpreted broadly, for example, may be fixedly connected, or detachably connected, or integrally connected, may be mechanically connected, or electrically connected, may be directly connected, or indirectly connected through an intermediate medium, or internally communicated between two elements. A person of ordinary skill in the art can understand specific meanings of these terms in the application in specific situations.

Specifically, a battery pack includes a battery box 1 and a plurality of battery units 2 accommodated in the battery box 1. The battery unit 2 includes end plates 21, side plates 22, and a plurality of battery cores 23 that are stacked together. Each battery core 23 includes a top cover plate, a positive electrode, a negative electrode, and a housing. A positive pole and a negative pole (the positive and negative poles are not distinguished in the drawings) are arranged in the top cover plate. The positive pole and the negative pole are electrically connected to a positive electrode and a negative electrode (not shown in the drawings) of the battery core 23 respectively through conductive connectors. A power supply part in the battery core 23 is formed by spirally winding the positive electrode, the negative electrode, and a separator. The separator is an insulator between the positive electrode and the negative electrode. The housing is constructed as a cube to form a space (or cavity) for accommodating the positive and negative electrodes, and the separator therein. In addition, an opening is provided on one side of the housing to allow access to (or communication with) the internal space. The top cover plate covers the opening. Further, a plurality of end plates 21 and side plates 22 may be provided, which can also reduce a weight of the battery pack as much as possible while fixing the battery cores 23 in this embodiment. A single group of the battery unit 2 includes two end plates 21 and two side plates 22. A plurality of battery cores 23 that are stacked together are accommodated in an accommodating cavity formed by alternately connecting the end plates 21 and the side plates 22 end to end in sequence.

As shown in FIG. 1, FIG. 3, FIG. 4, and FIG. 5, in this embodiment, the battery pack further includes a battery box 1. At least one battery unit 2 is located in the battery box 1. Specifically, reinforcing members are arranged on a bottom surface of the battery box 1. The side plates 22 of the battery unit 2 are stacked on the reinforcing members in a height direction of the battery box 1. During assembly of the battery pack, the end plates 21 and the side plates 22 of the battery units 2 are alternately connected in sequence, the battery cores 23 that are stacked together are placed in the accommodating cavity formed by the end plates 21 and the side plates 22, and finally, the side plates 22 are stacked on the reinforcing members on the bottom surface of the battery box 1 in the height direction of the battery box 1. Through the stacking fit of the side plates 22 and the reinforcing members on the bottom surface of the battery box 1, the structural strength of the reinforcing members is improved, thereby improving the structural strength of the overall battery box 1, and ensuring the firmness and stability of a connection between the battery pack and a finished vehicle. This structure design uses the stacking fit of the side plates 22 of the battery units 2 and the reinforcing members arranged in the battery box 1 to increase a thickness of the reinforcing members in the battery box 1, thereby improving the structural strength of the reinforcing members, and improving the overall strength of the battery box without increasing an original weight of the battery pack. The design is smart, and the structure is reasonable, which reduces energy consumption of a vehicle.

Figure 1:
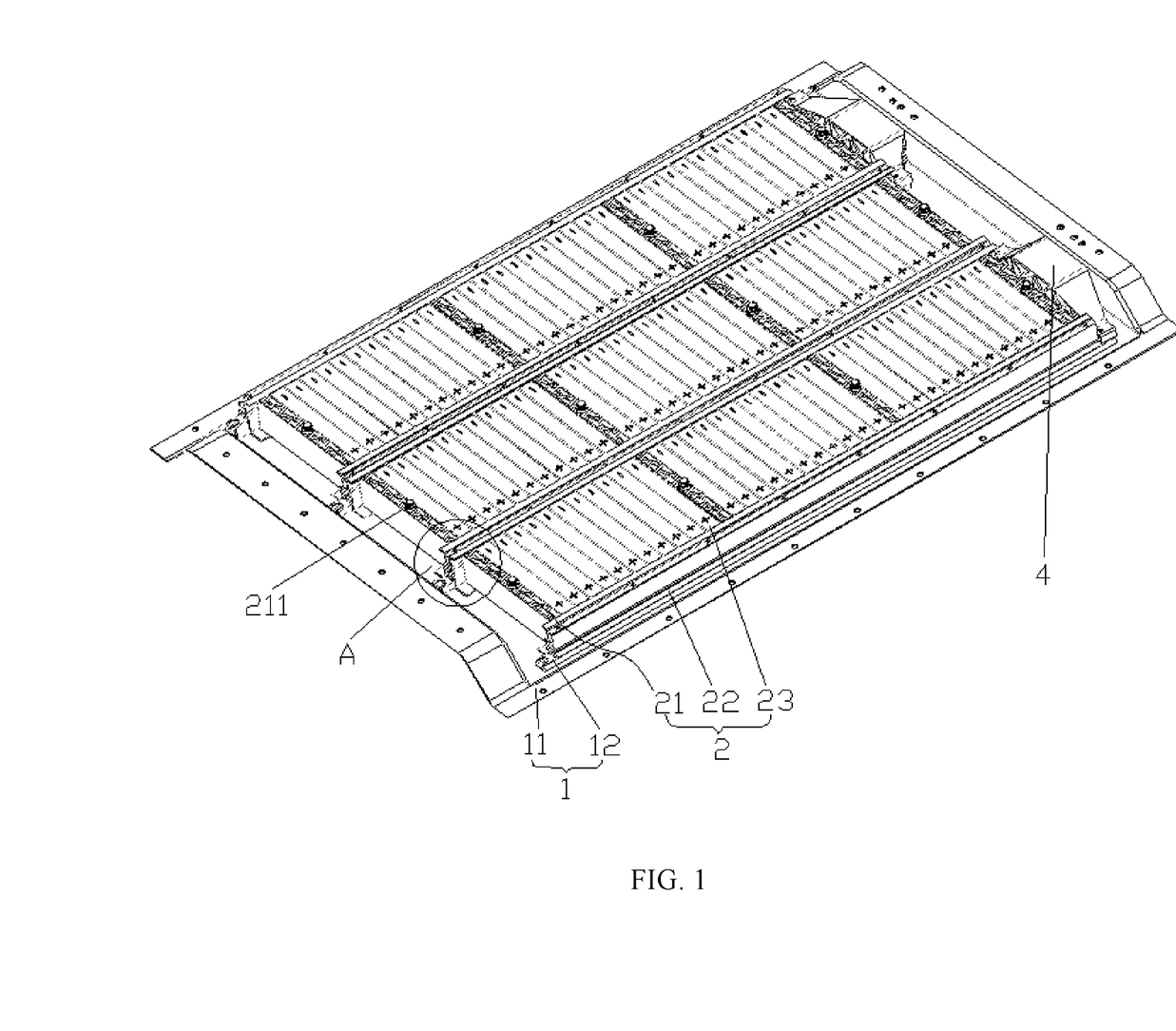
FIG. 1 is a schematic structural diagram of a battery pack provided by an embodiment of the application.

The reinforcing members may be connected to the battery box 1 through bonding, welding, or the like. In this embodiment, to further improve the structural strength of the battery box 1 and simplify an assembling process of the battery pack, the reinforcing members are integrally formed with the battery box 1.

In this embodiment, the height direction of the battery box 1 is a direction of a straight line where a Y axis is located.

Further, one or more battery units 2 may be provided. To provide enough power to ensure normal and long-term operation of the vehicle, in this embodiment, preferably, a plurality of the battery units 2 are provided. The reinforcing member and the side plates 22 corresponding to two adjacent battery units 2 are stacked together in the height direction of the battery box 1.

Figure 2:
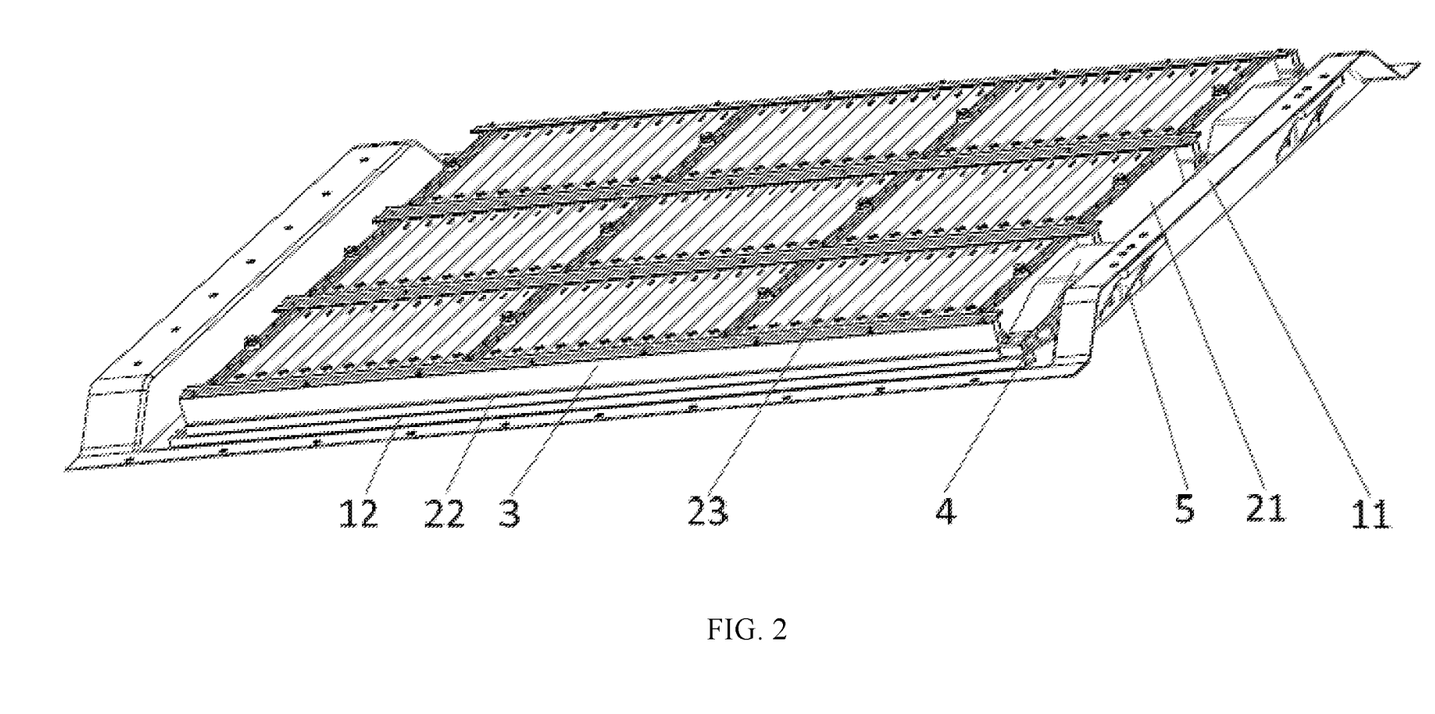
FIG. 2 is a schematic structural diagram of FIG. 1 from another view of point.

As shown in FIG. 1 and FIG. 2, it should be noted that, when the plurality of battery units 2 are accommodated in the battery box 1, the plurality of battery units 2 may be connected in parallel (arranged in a direction perpendicular to the side plates 22), or may be connected in series (arranged in a length direction of the side plates 22). When the battery units 2 are connected in series, the side plates 22 are only stacked with the reinforcing member of the battery box 1, and the side plates 22 of two adjacent battery units 2 are arranged at the same height. The side plates 22 of two adjacent battery units 2 may be connected through bonding, welding, or the like. Further, to facilitate mounting and simplify a process, when the plurality of battery units 2 are connected in series, the battery units 2 that are connected in series share the same side plate 22 on the same side. The adjacent group of battery cores 23 that are stacked together share the same end plate 21.

As shown in FIG. 1, FIG. 3, FIG. 4, FIG. 5, and FIG. 6, specifically, the side plate 22 includes a side plate body 221, and a bottom supporting plate 222 and a first connecting plate 223 that are oppositely arranged on two sides of the side plate body 221. The end plates 21 and the side plate bodies 221 are connected end to end in sequence to define an accommodating cavity. The battery cores 23 and the end plates 21 are all arranged on the bottom supporting plate 222. The bottom supporting plate 222 can provide a supporting surface for the battery cores 23 and the end plates 21, so as to reduce stress on the bottom surface of the battery box 1 and improve the strength of the battery box 1. In this embodiment, the first connecting plate 223 and the bottom supporting plate 222 may be connected to the side plate body 221 in a plurality of manners, such as bonding, welding, and clamping. To guarantee the overall strength of the side plates 22, preferably, the first connecting plate 223 and the bottom supporting plate 222 are integrally formed with the side plate body 221.

Further, in this embodiment, the first connecting plates 223 of the two adjacent battery units 2 are stacked together in the height direction of the battery box 1. In addition, the first connecting plates 223 that are stacked with each other are then stacked with the reinforcing members of the battery box 1 in the height direction (Y-axis direction) of the battery box 1.

In order that each battery unit 2 can be arranged more stably in the battery box 1, the end plate 21 may be connected to the bottom surface of the battery box 1 by bolts, or more glue may be applied between the battery cores 23, between the end plates 21, the side plate bodies 221 and the battery cores 23. As shown in FIG. 1, FIG. 3, FIG. 4, and FIG. 5, in this embodiment, to avoid the reduction of strength caused by forming a bolt hole in the bottom surface of the battery box 1 and simplify the assembling process, the battery pack further includes a pressing piece 3 located in the battery box 1. The battery cores 23 and the end plates 21 are all clamped between the pressing piece 3 and the bottom supporting plate 222. The stability of each battery unit 2 being placed in the box body 11 is ensured by clamping the battery cores 23 and the end plates 21 between the pressing piece and the bottom supporting plate 222.

Further, the pressing piece 3, the first connecting plate 223, and the reinforcing member are stacked together in sequence in the height direction of the battery box 1. In this embodiment, this structure design can further increase a height of the reinforcing member, thereby improving the structural strength of the reinforcing member, and improving the structural strength of the overall battery box 1.

Still referring to FIG. 1, FIG. 3, FIG. 4, and FIG. 5, specifically, the pressing piece 3 includes a second connecting plate 31 and a pressing plate 32 connected to the second connecting plate 31. In the height direction of the battery box 1, the second connecting plate 31, the first connecting plate 223, and the reinforcing member may be stacked together in sequence through bonding, welding, or the like. To further improve the structural strength of the battery box 1 and facilitate assembling, in this embodiment, the second connecting plate 31, the first connecting plate 223, and the reinforcing member are stacked together in sequence through connecting pieces in the height direction of the battery box 1. The connecting pieces may be rivets, bolts, or the like. Preferably, the connecting pieces are bolts. The bolts have a large size, which can further share the stress in the battery box 1. Further, the battery cores 23 and the end plates 21 are all clamped between the pressing plate 32 and the bottom supporting plate 222.

Figure 5:
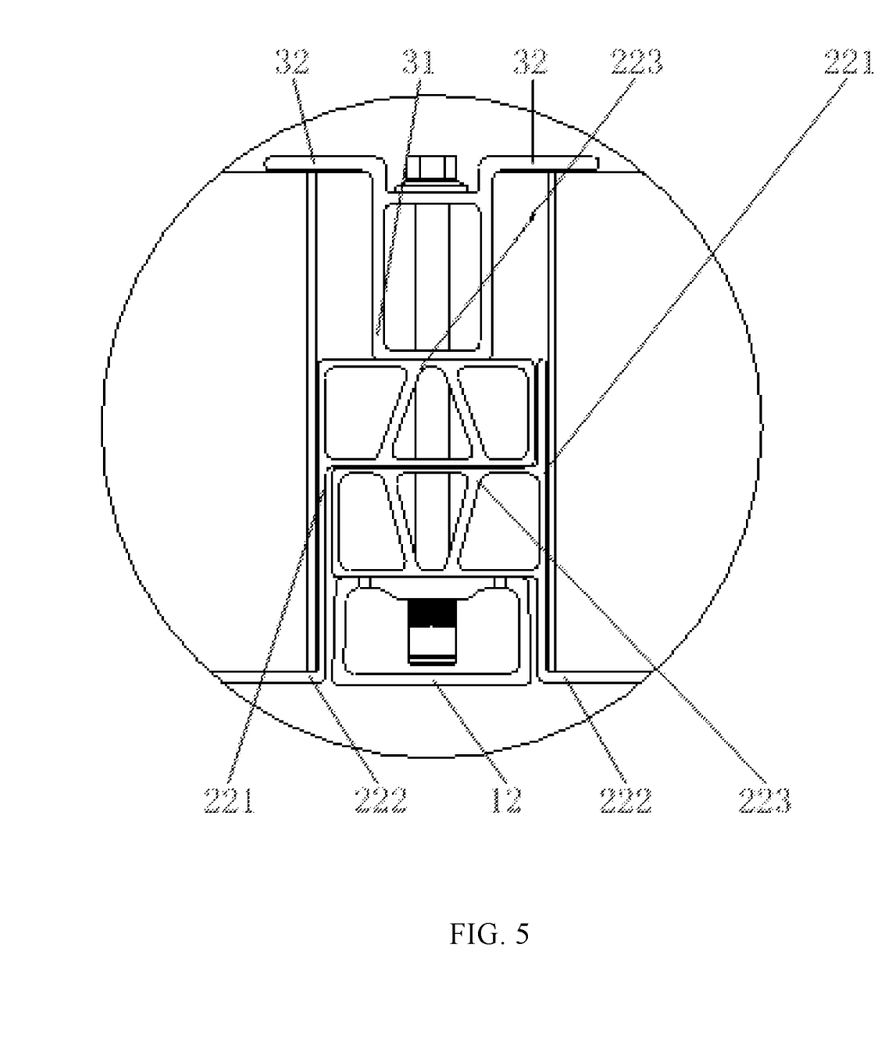
FIG. 5 is a main view of FIG. 4.

The reinforcing members may be of a straight rod-like or cubic structure, or may be a mesh structure. Specifically, the battery box 1 includes a box body 11 that is arranged as a cavity structure and a plurality of cubic reinforcing beams 12 that are connected to a bottom surface of the box body 11 at equal spacings. The reinforcing beams 12 are the reinforcing members mentioned above. The pressing plate 32 may be lower than the second connecting plate 31, or the pressing pate 32 may be arranged at the same height as the second connecting plate 31. In this embodiment, to reduce an overall height of the box body 11, facilitate the mounting of the battery pack to the finished vehicle, and reduce a size of the battery pack, as shown in FIG. 5, preferably, the pressing plate 32 is higher than the second connecting plate 31, and a recessed portion 33 is formed between the pressing plate 32 and the second connecting plate 31. When the first connecting plate 223, the second connecting plate 31, and the reinforcing beams 12 are connected by bolts, bolt caps of the bolts may be located in a height difference formed between the pressing piece 3 and the second connecting plate 31.

In this embodiment, the first connecting plate 223 and the second connecting plate 31 may be arranged perpendicular to the reinforcing beams 12. The first connecting plate 223, the second connecting plate 31, and the reinforcing beams 12 may alternatively be arranged in parallel in the direction perpendicular to the stacking direction of the battery cores 23. To guarantee that the structural strength of the box body 11 can be maximized after the first connecting plate 223, the second connecting plate 31, and the reinforcing beams 12 are stacked together, as shown in FIG. 1, FIG. 3, FIG. 4, and FIG. 5, preferably, the first connecting plate 223, the second connecting plate 31, and the reinforcing beams 12 are all parallel to the stacking direction of the battery cores 23.

As shown in FIG. 2, to facilitate assembly of the plurality of battery units 2 in groups and the box body 11 and arrangement of some external electrical components, when the plurality of battery units 2 in groups are arranged in the box body 11, a gap is reserved at each of the two ends of the box body 11 in the stacking direction of the battery cores 23. A plurality of electrical components are arranged at one end of the overall box body 11 of the battery pack, to connect to a circuit of the vehicle. Further, in this embodiment, to further improve the overall structural strength of the battery box 1, the battery pack further includes a first reinforcing bracket 4 arranged between two adjacent reinforcing beams 12 and a second reinforcing bracket 5 arranged on an outer wall of the box body 11. The first reinforcing bracket 4 is connected to the second reinforcing bracket 5 in the stacking direction of the battery cores 23 through connecting pieces. Acting force exerted on the reinforcing beams 12 may be transferred to a peripheral side plate of the box body 11 through the first reinforcing bracket 4, so as to improve the structural strength of the overall box body 11.

First reinforcing brackets 4 may be arranged at the spaces at the two ends of the box body 11, which guarantees that the force on the reinforcing beams 12 can be transferred to the peripheral side plates of the box body 11, without increasing the overall height of the battery pack as much as possible. Preferably, the first reinforcing bracket 4 is only arranged at one end of the box body 11.

During hoisting of the battery pack, a hoisting tool may be directly connected to the two ends of the battery box 1. As mentioned earlier, many electrical components are arranged at one end of the battery box 1, which means the end with many electrical components is heavier. To improve the safety during the hoisting, further, in this embodiment, the battery pack further includes a second reinforcing bracket 5 arranged on the outer wall of the box body 11. The first reinforcing bracket 4 is connected to the second reinforcing bracket 5 in the stacking direction of the battery cores 23 through the connecting pieces. The hoisting tool can be connected at the second reinforcing bracket 5 during the hoisting of the overall battery pack by connecting the reinforcing bracket 5 arranged on the outer wall of the box body 11 to the reinforcing bracket 4, so as to improve the safety of the overall hoisting process.

In this embodiment, the connecting pieces may be rivets, bolts, and the like, which is not specifically defined herein.

Figure 3:
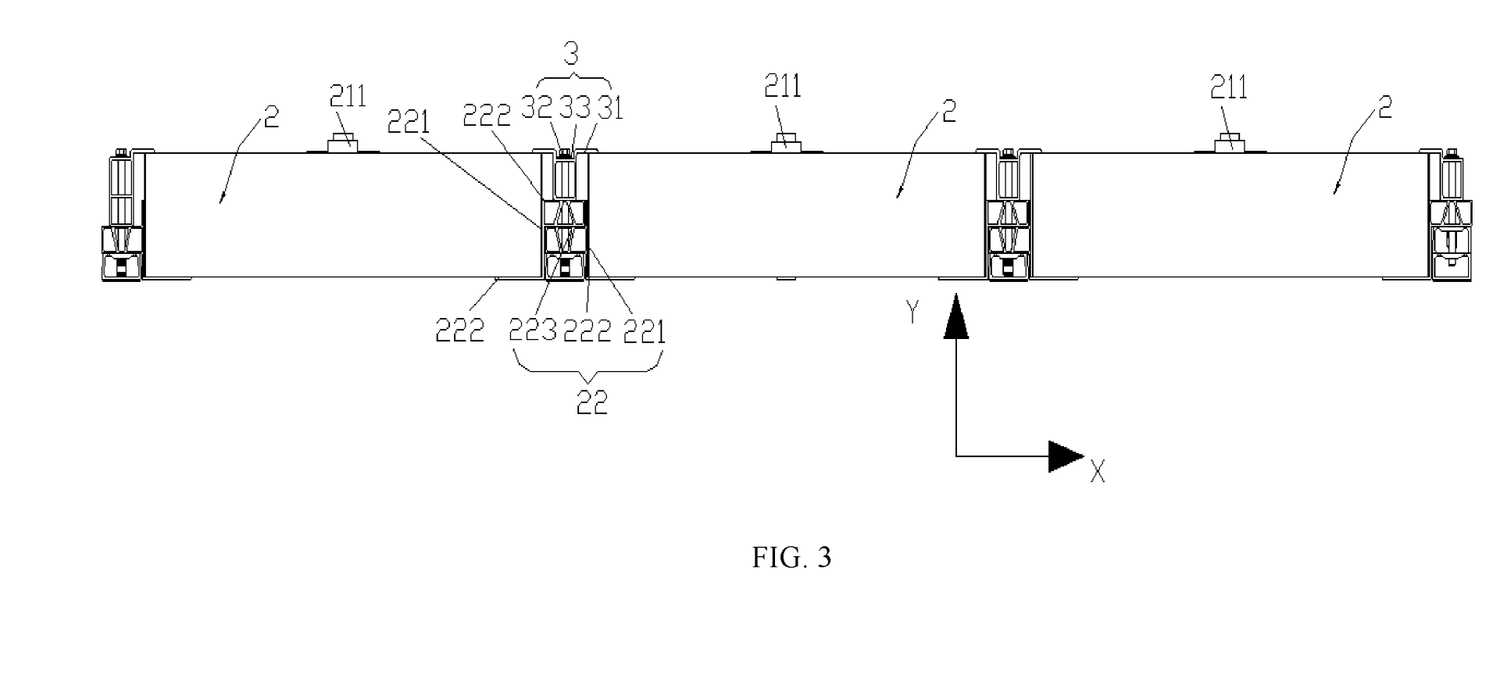
FIG. 3 is a schematic internal structure diagram of FIG. 1.
Figure 4:
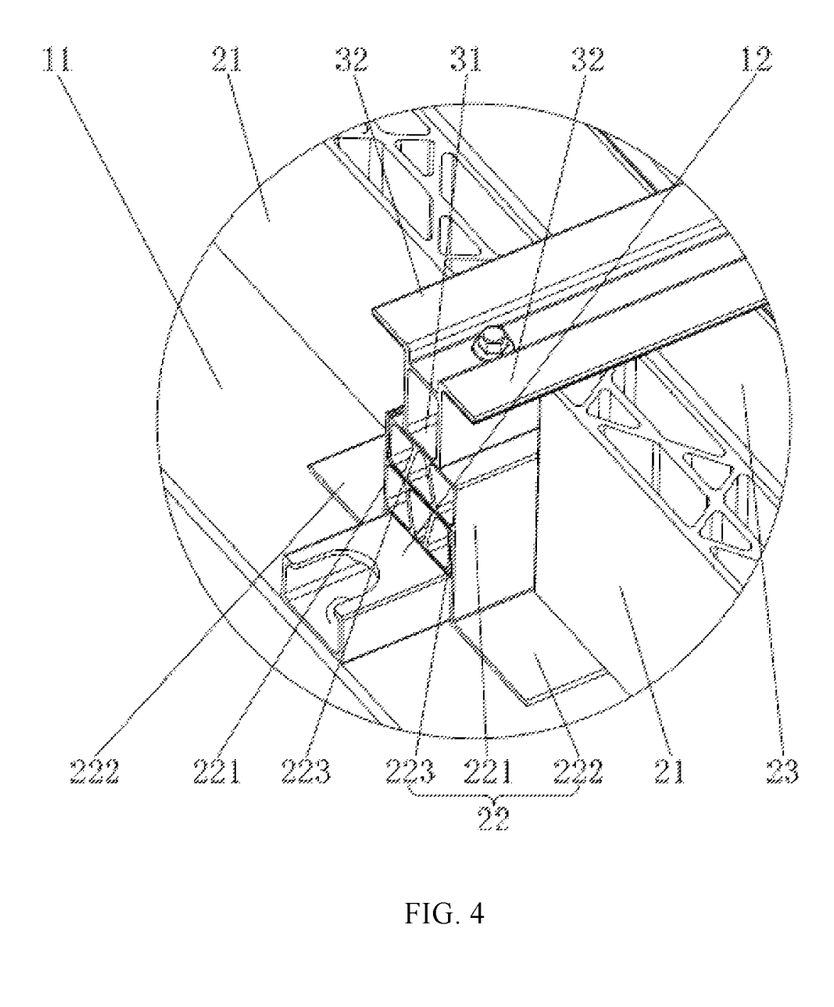
FIG. 4 is an enlarged view of a position A in FIG. 1.
Figure 6:
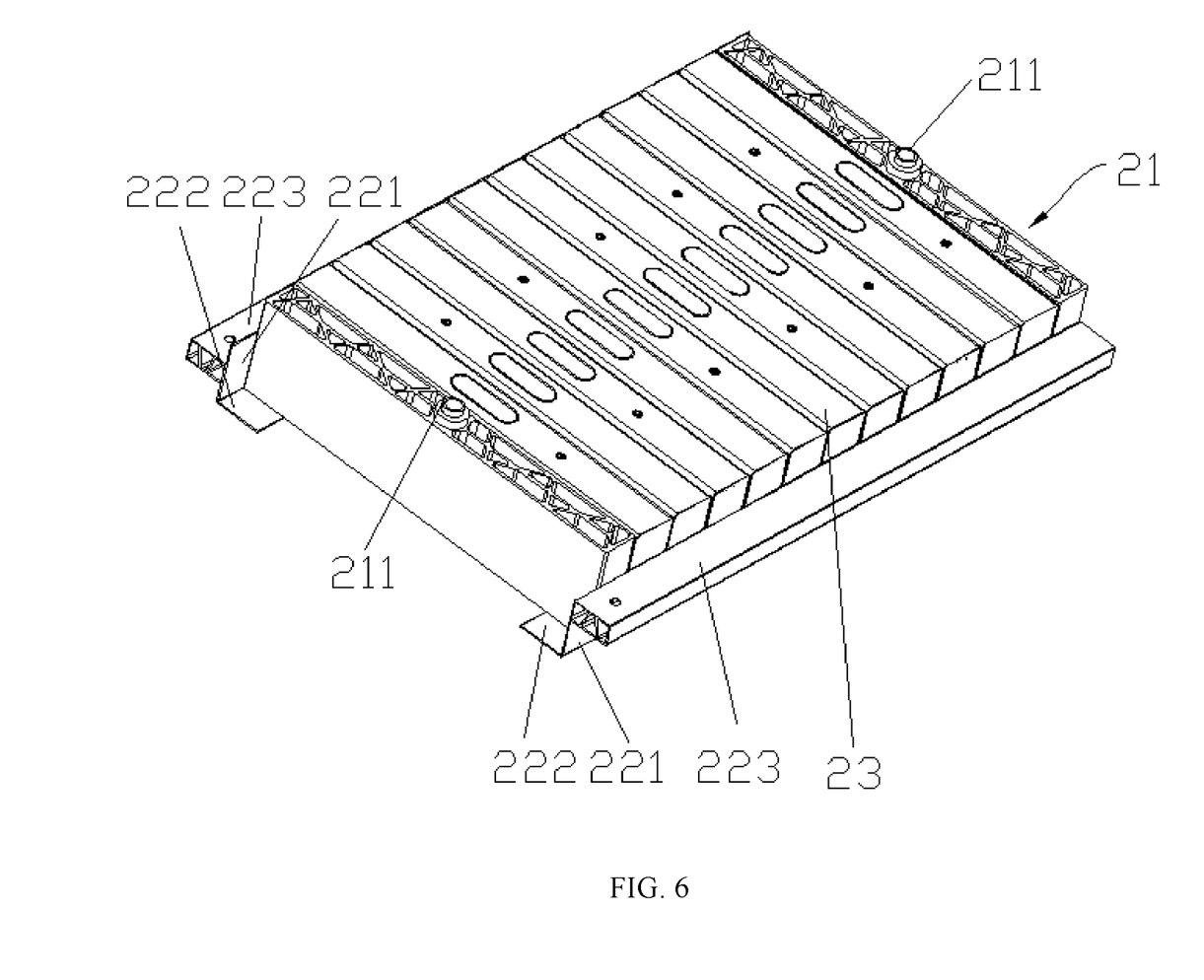
FIG. 6 is a schematic structural diagram of a battery unit in FIG. 1.
Figure 7:
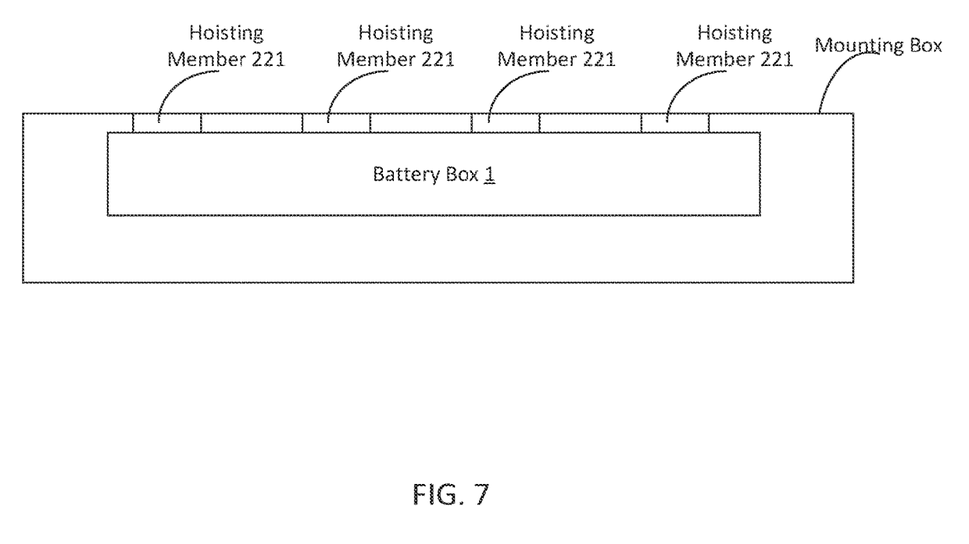
FIG. 7 shows an example arrangement of a mounting box, a battery box and hoisting members in a vehicle, where the battery pack shown in FIG. 1 is mounted on the mounting box.

The box body 11 of the battery box 1 may be provided with a box cover. In this embodiment, the battery pack is in a stacking fit with the reinforcing beams 12 arranged in the battery box 1 by using the first connecting plate 223 and the second connecting plate 31, to increase the thickness of the reinforcing beams 12 in the battery box 1, thereby improving the structural strength of the battery box 1, and improving the overall strength of the battery box 1 without increasing an original weight of the battery pack. This avoids arranging a plurality of mounting brackets and high-strength beams around the box body 11 to guarantee the structural strength of the overall battery box 1. Therefore, the overall weight of the battery pack is relatively light. As shown in FIG. 3 and FIG. 6, specifically, a hoisting member 211 is arranged on an end surface of the end plate 21 facing away from the bottom surface of the box body 11, the battery pack is hoisted onto the top plate of the mounting box of the vehicle through the hosting piece 211, which avoids lowering of the structure of the box body 11 caused by forming a mounting hole in the bottom surface of the box body 11 of the battery box for connecting the battery pack to the mounting box of the vehicle. In addition, the battery pack is hoisted in the mounting box of the vehicle, and a top surface of the mounting box of the vehicle is used as the box cover of the box body 11 of the battery box 1. The design is smart, and the structure is reasonable.

As shown in FIG. 3, FIG. 4, FIG. 5, and FIG. 6, to reduce the weight of the battery pack better, the first connecting plate 223, the second connecting plate 31, the reinforcing beams 12, the first reinforcing bracket 4, and the second reinforcing bracket 5 may be made of lightweight solid aluminum materials. In this embodiment, to further reduce the overall weight of the battery pack, and guarantee the overall structural strength of the battery box 1 through the stacking design, specifically, the first connecting plate 223, the second connecting plate 31, the reinforcing beams 12, the first reinforcing bracket 4, and the second reinforcing bracket 5 may all be made of aluminum profiles with cavities.

An embodiment provides a vehicle. The vehicle includes a mounting box and the battery pack described in any of the foregoing embodiments. The battery pack is mounted on the mounting box through the hoisting members. A top surface of the mounting box is a box cover of the box body of the battery box.

In this embodiment, the battery pack is hoisted on a top plate of the mounting box of the vehicle through the hoisting members, which avoids lowering of the structure of the box body 11 caused by forming a mounting hole in the bottom surface of the box body 11 of the battery box 1 for connecting the battery pack to the mounting box of the vehicle. In addition, the battery pack is hoisted in the mounting box of the vehicle, and the top surface of the mounting box of the vehicle is used as the box cover of the box body 11 of the battery pack 1, which simplifies a structural design and reduces the cost. The vehicle may be a new energy vehicle.

In conclusion, it should be noted that each foregoing embodiment is merely intended for describing the technical solutions of the application but not for limiting the application. Although the application is described in detail with reference to each foregoing embodiment, persons of ordinary skill in the art should understand that they may still make modifications to the technical solutions described in each foregoing embodiment or make equivalent replacements to some or technical features thereof, without departing from the scope of the technical solutions of each embodiment of the application.

What is claimed is:

1. A battery pack, comprising:
  a battery box, the battery box comprising reinforcing members being arranged on a bottom surface of the battery box, the reinforcing members being inside the battery box; and
  at least one battery unit located in the battery box, and the at least one battery unit comprising:
  end plates;
  side plates, wherein the side plates and the end plates are connected end to end in sequence to define an accommodating cavity, and the side plates are stacked on the reinforcing members in a height direction of the battery box; and
  a plurality of battery cores, located in the accommodating cavity; and, wherein the side plate comprises:
  a side plate body, the end plates and the side plate bodies being connected end to end in sequence to define the accommodating cavity;
  a bottom supporting plate, the battery cores and the end plates being all arranged on the bottom supporting plate; and
  a first connecting plate, the first connecting plate and the bottom supporting plate being oppositely arranged on two sides of the side plate body, wherein two adjacent first connecting plates are stacked together.

2. The battery pack according to claim 1, wherein a plurality of the battery units are provided in the accommodating cavity, wherein the reinforcing member and two adjacent side plates are stacked together in the height direction of the battery box.

3. The battery pack according to claim 1, wherein in a direction perpendicular to the first connecting plate, two adjacent first connecting plates are stacked together in the height direction of the battery box.

4. The battery pack according to claim 1, further comprising:
  a pressing piece, located in the battery box, and the pressing piece, the first connecting plate, and the reinforcing member being stacked in sequence in the height direction of the battery box, wherein
  the battery cores and the end plates are all clamped between the pressing piece and the bottom supporting plate.

5. The battery pack according to claim 4, wherein the pressing piece comprises:
  a second connecting plate, the second connecting plate, the first connecting plate, and the reinforcing member are stacked together in sequence in the height direction of the battery box through connecting pieces; and
  a pressing plate, connected to the second connecting plate, the battery cores and the end plates being all located between the pressing plate and the bottom supporting plate.

6. The battery pack according to claim 5, wherein the pressing plate is higher than the second connecting plate, and a recessed portion is formed therebetween.

7. The battery pack according to claim 5, wherein the battery box comprises:
  a box body; and
  a plurality of reinforcing beams, connected to a bottom surface of the box body at equal spacings, the first connecting plate, the second connecting plate, and the reinforcing beams being all parallel to the stacking direction of the battery cores, and the reinforcing beams being the reinforcing members.

8. The battery pack according to claim 7, further comprising:
  a first reinforcing bracket, connected between two adjacent reinforcing beams; and
  a second reinforcing bracket, arranged on an outer wall of the box body, the first reinforcing bracket being connected to the second reinforcing bracket through connecting pieces.

9. The battery pack according to claim 7, wherein a hoisting member is arranged on an end surface of the end plate facing away from the bottom surface of the box body; and the battery pack is hoisted on a top plate of a mounting box of a vehicle through the hoisting member.

10. The battery pack according to claim 8, wherein the first connecting plates, the second connecting plates, the reinforcing beams, the first reinforcing brackets, and the second reinforcing brackets are all made of aluminum profiles with cavities.

11. A vehicle, comprising a mounting box and the battery pack according to claim 1, wherein
  the battery pack is mounted on the mounting box through hoisting members, wherein a top surface of the mounting box is a box cover of a box body of the battery box.

* * * * *